United States Patent [19]

Borsari

[11] Patent Number: 5,386,093
[45] Date of Patent: Jan. 31, 1995

[54] METHOD FOR ELECTROEROSIVE CUTTING AND WIRE EDM MACHINE

[75] Inventor: Claudio Borsari, Tegna, Switzerland

[73] Assignee: AGIE, A.G. für industrielle Elektronik, Losone

[21] Appl. No.: 878,382

[22] Filed: May 4, 1992

[30] Foreign Application Priority Data

May 3, 1991 [DE] Germany .............................. 4114510

[51] Int. Cl.6 ........................... B23H 7/06; B23H 7/20
[52] U.S. Cl. ............................... 219/69.12; 219/69.17; 364/474.04
[58] Field of Search ............... 219/69.12, 69.13, 69.17; 364/474.04

[56] References Cited

U.S. PATENT DOCUMENTS

| 4,544,819 | 10/1985 | Nomura et al. | 219/69.12 |
| 4,571,477 | 2/1986 | Weber | 219/69.17 |
| 5,043,550 | 8/1991 | Sakaue | 219/69.12 |
| 5,047,606 | 9/1991 | Hiramine | 219/69.12 |

FOREIGN PATENT DOCUMENTS

| 0059639 | 9/1982 | European Pat. Off. | |
| 2650972 | 2/1991 | France | |
| 3902173 | 8/1989 | Germany | |
| 3933152 | 4/1990 | Germany | |
| 4026141 | 3/1991 | Germany | |
| 1-121126 | 5/1989 | Japan | 219/69.12 |
| 1264722 | 10/1989 | Japan | 219/69.12 |
| 3-79232 | 4/1991 | Japan | 219/69.17 |
| 3245918 | 11/1991 | Japan | 219/69.12 |
| 2234930 | 2/1991 | United Kingdom | 219/69.12 |
| 2236410 | 4/1991 | United Kingdom | 219/69.13 |
| 2236411 | 4/1991 | United Kingdom | 219/69.12 |
| 91-04121 | 4/1991 | WIPO | 219/69.12 |

OTHER PUBLICATIONS

"Fertigungsverfchren Band 3" pp. 24–38, W. Konig, VDI Verlag, GmbH Dusseldorf, 1990.

Primary Examiner—Geoffrey S. Evans
Attorney, Agent, or Firm—Christa Hildebrand

[57] ABSTRACT

A method of electroerosive wire cutting at least one shaped piece in a workpiece, in which it is cut by a solid cut along a first path, at least one parting cut along a second path, and at least one finish cut along the first and second paths, the sequence of cuts being variable according to the operating conditions. The operating conditions can include presence of a user so that the parting cut is carried out upon the presence of the operator.

8 Claims, 10 Drawing Sheets

METHOD FOR ELECTROEROSIVE CUTTING AND WIRE EDM MACHINE

FIELD OF THE INVENTION

The present invention relates to a method for the electroerosive cutting of at least one shaped piece in at least one workpiece, in which at least one shaded piece is machined by a solid cut, a parting cut and, in each case, at least one finish cut. In addition, the invention concerns a wire discharge machine having a control for the sequence of cuts.

BACKGROUND OF THE INVENTION

In the electric discharge cutting of workpieces, the prime goal is to automate the cutting process or processes insofar as possible. The manual intervention of an operator and, in particular, the need for his presence for control purposes are to be avoided as far as possible. In the traditional wire discharge machines, this has had the result that, after programming, the necessary cuts can be effected substantially entirely automatically without the presence of the operator. The four most widely used types of cuts in electroerosive machining with the use of a wire are explained below.

For the cutting of a die in a workpiece, a starting hole is customarily the first step performed in the workpiece. A shape is cut around the starting hole into the workpiece which is to be machined. For this purpose, a solid cut is first of all effected into the workpiece. In order to improve the surface tolerances of the die to be produced, finish cuts are made along the path of the solid cut. These finish cuts, of course, proceed substantially faster than the solid cut since much less material need be removed.

In order that the shaped piece which has been cut out around the starting hole does not simply drop out of the workpiece and damage parts of the wire discharge machine, a short distance, the so-called parting-cut path, is initially left uncut after the solid cut. This parting-cut path is the final attachment between the workpiece and the shaped piece which has been cut out. When an operator is present, the parting cut is finally effected along the parting-cut path. The drop-out piece produced upon the cutting out of the workpiece can in this way be removed in controlled manner by the operator. Finally, after the parting cut, finish cuts are effected along the parting-cut path in order to improve the surface quality of the die.

In the case of a punch, substantially the same shaped pieces are produced as in the case of a die. Differing from the production of a die however, the starting point for the cutting, i.e. the drilling of the starting hole, is located outside the punch, i.e. in the workpiece which still remains after the cutting. Nor is this surprising since, upon the production of a punch, the important factor is no longer the workpiece. It can therefore be to a certain extent destroyed by the starting hole.

The cutting sequence discussed above with respect to the die remains substantially the same upon the production of a punch. However, as soon as the solid cut and all finishing cuts along the solid cut path have been completed in the case of the production of a punch, the operator must so secure the punch in the workpiece that it remains therein. For this purpose, he can use different means, for instance magnets, adhesive parts, or else clamping between workpiece and shaped piece, in known manner.

Once the shaped piece—i.e. the punch—which has been almost completely cut out of the workpiece is fixed in place after the solid cut, the remaining parting cut and the following finishing cuts can be effected along the parting-cut path.

Differences in the production of dies and punches result from the fact that, in the case of the die, importance is placed on the inner surface of the cut workpiece while in the case of the punch, importance is placed on the outer surface of the workpiece. In both cases, the presence of the operator for the securing or removal of the shaped piece is required shortly before or during the carrying out of the corresponding parting cut.

For the sake of completeness, the two other customary types of cutting may also be mentioned: They are, on the one hand, the full-removal cut in which the material is eroded away within a contour without shaped pieces resulting. On the other hand, there is the so-called open contour, i.e. the machining of the outer side of a workpiece. With this type of cut, one proceeds substantially in exactly the same manner as upon the further machining of the aforementioned punch.

Until recently, the above explained presence of the operator was always necessary after a very specific sequence of cuts. Therefore, when certain cuts were completed and the operator was accordingly necessary but not present, this led to an uneconomic interruption of the entire machining process. This state of affairs is particularly disadvantageous upon the machining of several workpieces or upon the production of several shaped pieces in one workpiece. At the same time, up to now the operator was dependent on the wire discharge machine since, despite the best possible organization of the work, he nevertheless had to be present at a very specific moment, namely at the time of the parting cuts.

SUMMARY OF THE INVENTION

The object of the present invention is to overcome these disadvantages of known methods and wire discharge machines.

This object is achieved in the known method in the manner that the sequence of cuts is varied in accordance with the operating conditions. Thus, the cuts can be made dependent not only on when the operator is present, but consideration of further circumstances which affect the sequence of the cuts is also possible. For example, one can consider performing solid cuts, which require more energy, at a time when the cost of the energy required is less than usual. Furthermore, finish cuts which require a certain precision can be carried out at times at which certain external influences, such as for instance vibrations, caused for instance by the departure and landing of airplanes are not present.

In a preferred embodiment of the method of the invention, the operating condition is the presence of the operator and the time of this operating condition is fixed as the start of the cutting operation and the parting cut is effected upon the occurrence of this operating condition. In this way, it is possible for the operator himself to select the time for actual intervention in the generally lengthy operating process. He can adapt the time for this intervention to external conditions such as, for instance, day, night and holiday. For the cutting of several shaped pieces by at least one solid cut, a parting cut as well as at least, in each case, one finish cut, the parting cuts can in advantageous manner be carried out immediately after one another. The cutting process is thus ergonomically improved. The only process steps which make the presence of the operator necessary are in this way concentrated in time. By the utilization of the shortest possible times for the presence of the operator, his availability for use is improved. Shortly after his intervention, he is available again for other work.

In one preferred method, in particular for the cutting of at least one die, the solid cut thereof and then the parting cut and, after it, all of the finish cuts, are performed. In this way, the time for the intervention of the operator is made as early as possible. In another preferred method in accordance with the invention, particularly for the cutting of at least one die, the solid cut thereof is first effected, followed by a finish cut along the full-cut path, and then the parting cut thereof followed by a finish cut along the parting-cut path, and then further finish cuts along the entire path formed of full-cut and parting-cut paths. In this case, the process steps for the entire machining of workpieces are distributed uniformly around the time of intervention of the operator.

In another advantageous embodiment of the method of the invention, particularly for the cutting of at least one die, the solid cut thereof is first effected, followed by all the finish cuts along the path of the solid cut, followed by the parting cut and, finally, all finish cuts along the parting-cut path. In this case, the parting cut is delayed to the latest possible time.

In another advantageous embodiment of the method of the invention, at least one punch, in addition to the dies, is cut. For ergonomical reasons, the production of different shaped pieces can thus be combined with each other. In order to adapt the cuts of die or dies and punch to each other, particularly with respect to the intervention of the operator, a solid cut and then all finish cuts of the punch along the full-cut path thereof are carried out before the parting cut of the die or dies. For this purpose, it is particularly preferred that, after the parting cut of the die or dies, the parting cut of the punch and all finish cuts be carded out along its parting-cut path. With such a sequence of cuts in the case of the combined cutting of dies and punches, the securing of the drop-out piece in the case of the die and the fixing on the workpiece can take place immediately after each other. This results in a reduction in the period of intervention.

In another advantageous embodiment of the method of the invention, a full removal cut is carried out before and/or after the die and/or punch cuts. Such full-removal cuts take a large amount of time and can thus be combined as desired with cuts which require less time.

The above-mentioned object of the invention can advantageously be achieved in a wire discharge machine having a control for the sequence of cuts by such a design of the control that it selects the sequence of cuts which is most favorable for the existing operating conditions. In this way, the external conditions of the wire discharge machine can best be taken into account. The machine can be individually reset from case to case.

In another advantageous embodiment of the wire discharge machine of the invention, the control is designed in such a manner that it controls one or more parting cuts as follows: After the passage of a predetermined period of time (return of the operator who adjusts the machine), a first shaped piece is cut from the remaining workpiece, in which connection—in the case of several shaped pieces which are to be cut—all other parting steps follow immediately. The time for the presence of the operator is in this way minimized.

It is particularly preferred that the control be so designed that it automatically select the most favorable sequence of cuts. The operator need then not consider in time-consuming manner how he will arrange the individual cuts in time. He merely indicates the time of a parting cut; the other parting cuts are grouped optimally around the predetermined parting cut. The wire discharge machine can in this way be best utilized economically, down times being avoided. For this, the control is advantageously so designed that the time from the start of the cuts up to the first parting cut is calculated. Means for indicating the period of time from the start of the cuts up to the first parting cut are preferably provided. In this way, the operator can check in which method stage he is. He can contemplate and plan in the long term his preparations in connection with the monitoring of the parting steps. Over-hasty intervention and lost times connected therewith in the course of the process are avoided.

DESCRIPTION OF THE DRAWINGS

Embodiments of the invention are shown in the drawings and will be described in further detail below. In the drawings.

The construction and possibly also the manner of operation of the invention are described below with reference to the drawings.

DETAILED DESCRIPTION OF THE PREFERRED EMBODIMENTS

From the diagrams of FIGS. 1 and 2, it can be seen how die parting cuts 1 can be arranged in the time sequence of cuts in order to make the intervention of the operator in the cutting process necessary at an earlier or later moment.

Figure 1:
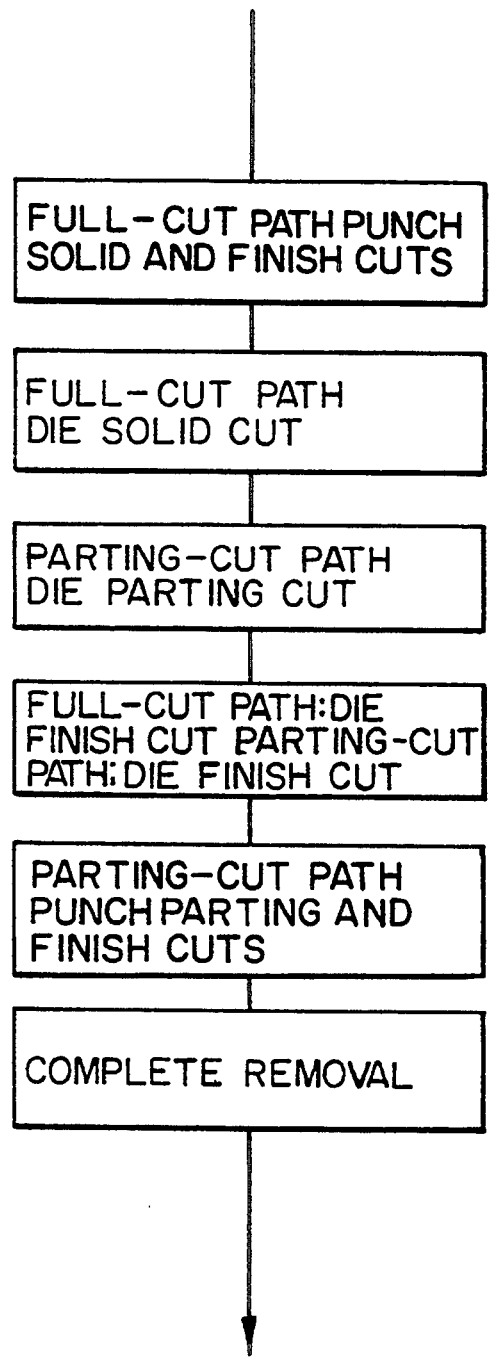
FIG. 1 is a flow diagram for a die parting cut carried out at an early time.

In the embodiment of FIG. 1, the operator intervenes early. He begins in his organization of the work of the cuts first of all with punch solid cuts 2 as well as punch finish cuts 3 along the full-cut path. These cuts are followed by die solid cuts 4. When these cuts are completed, only a small cutting path still remains along the die path to be cut, namely the cutting path for the die parting cut 1. As already explained, in the case of this parting cut, the operator must be present in order to check the movement of the resultant drop-out piece in the workpiece.

After the aforementioned punch cuts 2, 3, the path for the punch cut is also still not cut through in a short region. Since the punch is arranged by means of clamps or similar fixing devices in a given position on the workpiece for further machining and the fixing device used for this generally extends over the full-cut path, no cutting movement of the wire electrode along the full-cut path is possible any longer.

After the preparations described above have been carried out, the die parting cut 1 is effected, followed directly by the die finish cuts 5 along the full-cut path and the die finish cuts 6 along the parting-cut path. These cuts are followed by the punch parting cuts 7 as well as punch finish cuts 8 along the parting-cut path. Finally, the sequence of cuts can be supplemented by a complete removal 9.

In the flow diagram of FIG. 2, a late parting cut and, accordingly, later intervention of the operator than in FIG. 1 are shown. The cutting sequence in this embodiment commences with the complete removal 9, which is followed by the customary punch solid cuts 2 and punch finish cuts 3 along the full-cut path.

The die solid cuts 4 are then carried out. However, in contradistinction to the embodiment shown in FIG. 1, the die solid cut 4 is followed directly by the die finish cuts 5 along the full-cut path. The die is therefore prepared differently in connection with the organization of the cuts with late parting cut than in the case of the early parting cut insofar as all cuts are effected along the full-cut path prior to the die parting cut 1.

The die parting cut 1 is now effected. It is followed by the die finish cuts 6 along the parting-cut path. As was already true in the embodiment shown in FIG. 1, this is followed, also in the embodiment of FIG. 3, by the punch cutting steps 7 and the punch subsequent cuts 8 along the parting-cut path.

Figure 2:
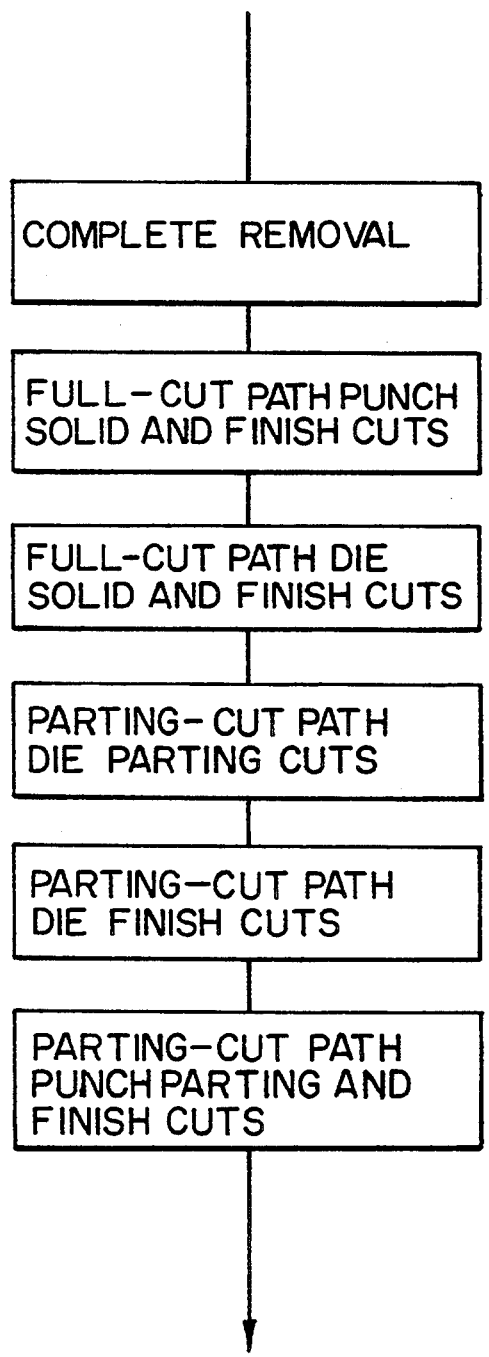
FIG. 2 is a flow diagram for a die parting cut at a late time.

In the embodiments of FIGS. 3a to 3d and 4a to 4d, the cutting sequences shown in FIGS. 1 and 2 for several workpieces are again shown on basis of their cut contours. Starting from a starting point 10, the electrode is first of all moved to a starting hole 11 in a workpiece C. From there the electrode is moved to the cutting path for the punch. This is followed by a punch solid cut 2 as well as the punch finish cuts 3 along the full-cut path. From the starting hole 11, the electrode moves to a starting point 12 and from there to a starting hole 13 in a workpiece D. The wire electrode carries out the same punch cuts also in this workpiece D. It moves back to the starting hole 13 and from there to a starting point 14 for the workpiece G. In this workpiece G, it carries out two additional punch cuts in accordance with the pattern explained above and passes there from a starting hole 15 to a starting hole 16 of a die. Starting from this cutting hole 16, the wire electrode first of all erodes a short path towards the outside and—applied to the desired contour—effects the first die solid cut 4. After this die solid cut 4, the wire electrode is pulled back to the starting hole 16 and moved from there over the shortest path to another starting hole 17. Starting from this starting hole 17, the wire electrode effects the same die solid cut 4 as explained above, the starting hole 17 in this case also representing the end point of the movement.

From the starting hole 17 the wire electrode is moved over the shortest distance to the starting point 18 with reference to a workpiece E. From the starting point 18, the wire electrode moves to a starting hole 19 in a workpiece E. The starting hole 19, as customary in the case of die cuts, is located within the contour, which is elliptical in the present case, i.e. within the drop-out piece. As previously, the wire electrode performs an ordinary die solid cut and is finally moved back again to the starting hole 19. From there, the wire electrode passes to another starting point 20 for a workpiece F. From the starting point 20, it is moved to the starting hole 21, from where, after a short distance of introduction, it carries out the die full-cut movement described above, the end of the movement of the wire electrode being again the staging hole 21.

The cuts in the workpieces C, D, E, F and G have now been effected to such an extent that the operator can intervene in order to carry out the required parting cuts. The sequence of cuts necessary for this and the actions of the operator can be noted from FIGS. 3b and 3c.

Figure 3A:
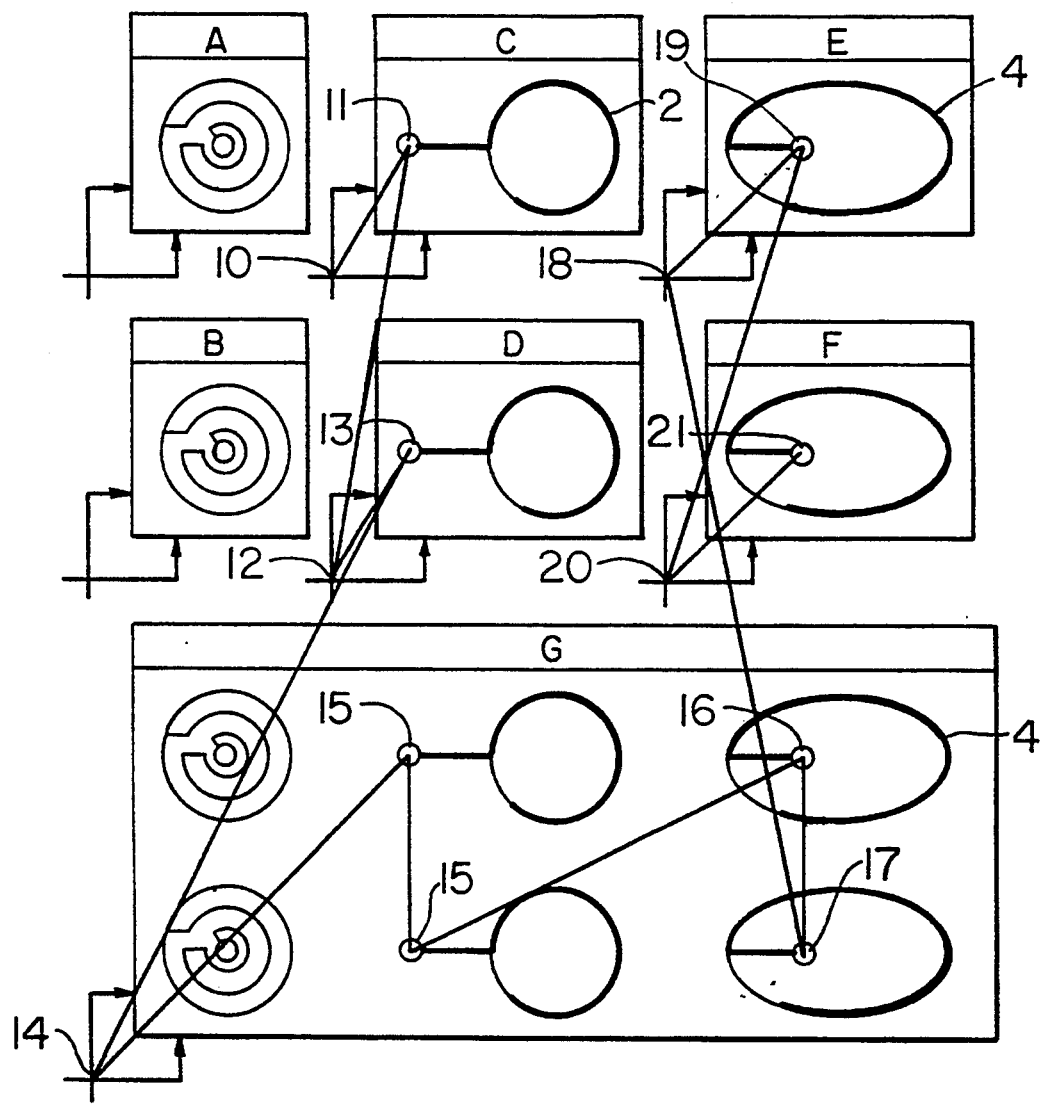
FIGS. 3a, 3b, 3c and 3d show the cutting sequence for several types of cuts and several workpieces with early parting cut.
Figure 3B:
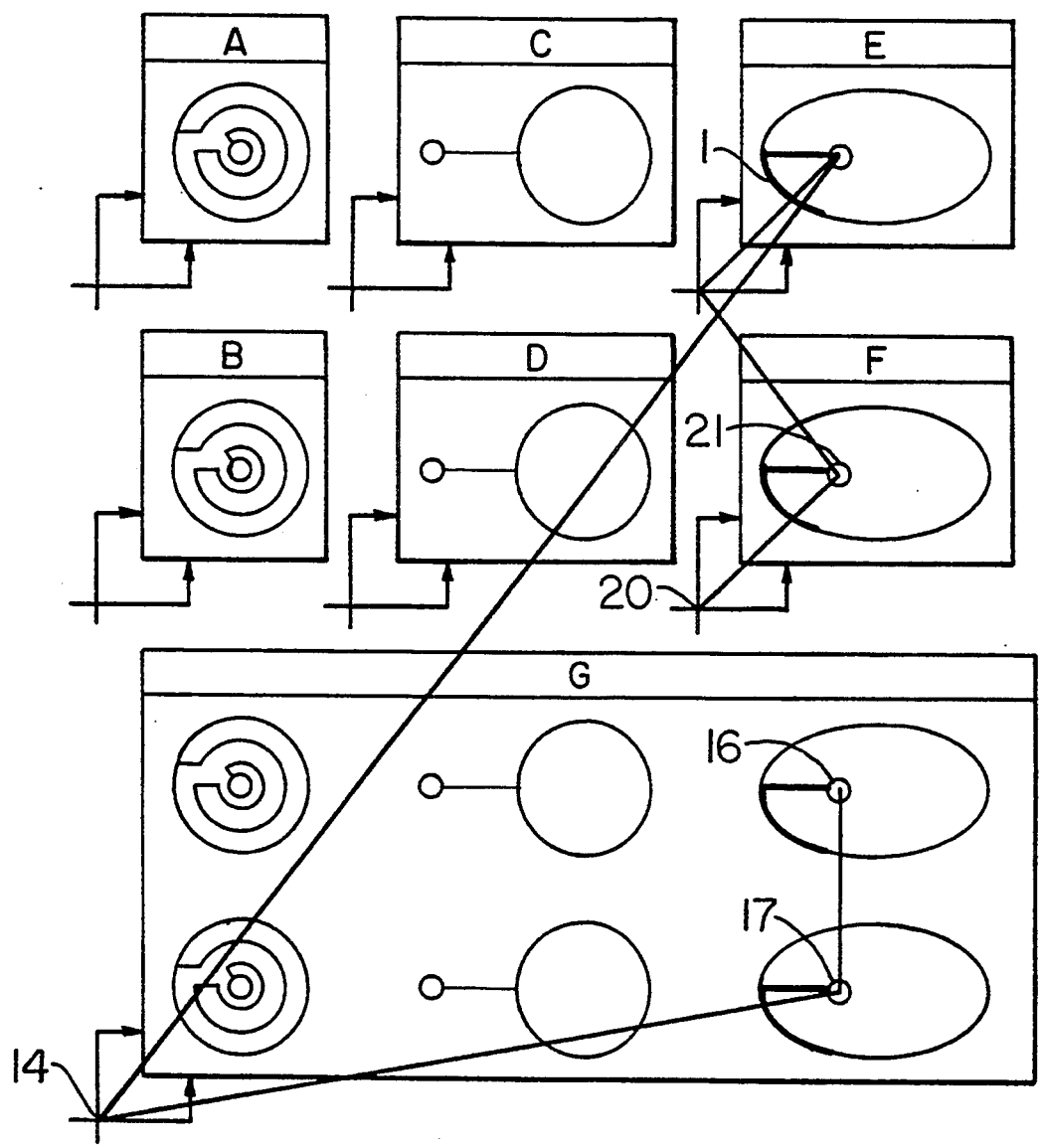
Figure 3C:
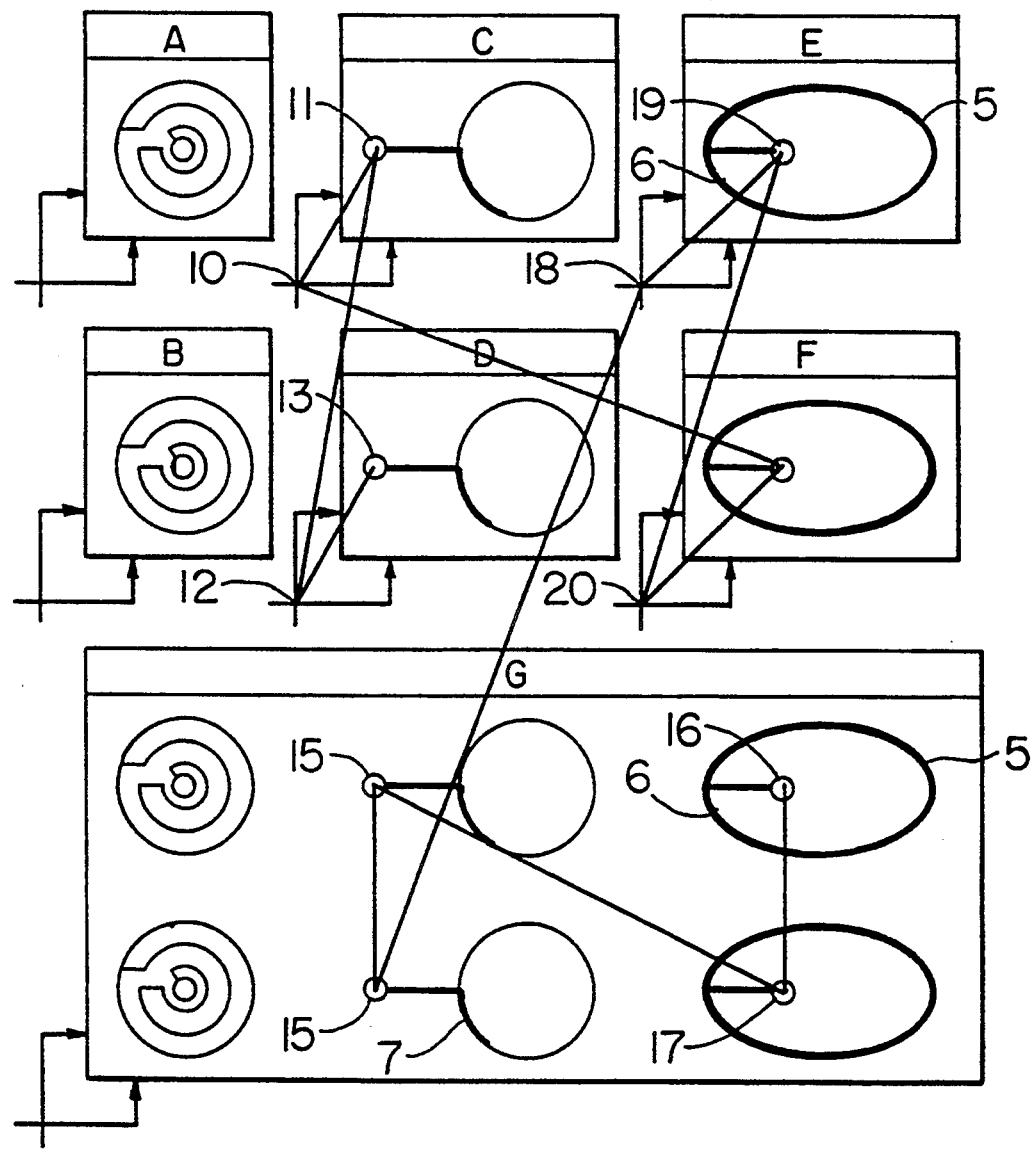
Figure 3D:
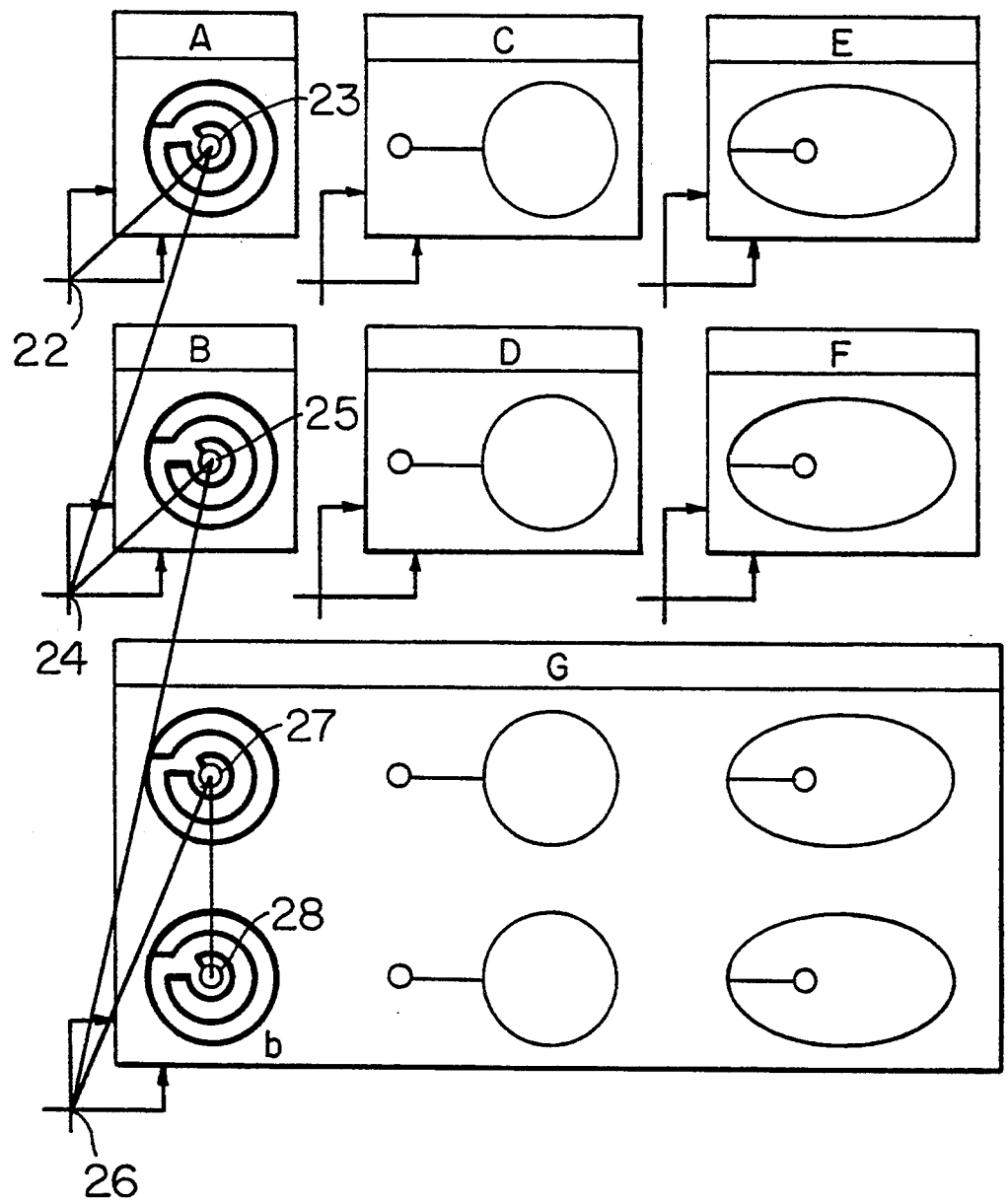

From the starting point 20 in FIG. 3d, the wire electrode again moves for adjustment reasons in the direction of the starting hole 21. From this starting hole 21, the wire electrode effects a movement in the direction towards the outside, towards the contour, and cuts a die parting cut 1 along the still uncut contour path. After the die parting cut 1, the wire electrode is moved back to the starting hole 21 and remains there until the drop-out piece has been removed by the operator. In this way, damage to the wire discharge machine can be avoided.

The wire electrode is then moved to the starting point 16 and from there to the starting hole 19 of the workpiece E. Another die parting cut 1 is effected, as described previously, this time in the workpiece E. Having arrived back again at the starting hole 19, the wire electrode is moved to the starting point 14 for the workpiece G. Starting from here, the electrode is first of all moved to the starting hole 17, performs the die parting cut 1 there, and returns to the starting hole 17, from where it moves to the starting hole 16 of another contour in the workpiece G and effects there the final die parting cut 1. The wire electrode finally remains in place at the starting hole 16.

In FIG. 3c, it is shown how the wire electrode now, proceeding from the starting hole 16, first of all effects the remaining finish cuts 5 and 6 along the full-cut path and along the parting-cut path. The same steps are then carried out, starting from the starting hole 17, also in the workpiece G. The wire electrode is moved from the starting hole 17 to one of the two starting holes 15. Since, when the operator is present, the punches have been secured within the workpieces C, D and G, the parting cut 7 with respect to the punches can now take place as well as all punch finish cuts 8 along the parting-cut path. When the wire electrode has arrived, after these punch parting cuts 7 and punch finish cuts 8, along the parting-cut path in the further starting hole 15, it moves further to the starting hole 18 for the workpiece E and from there to the starting hole 19 of said workpiece. From the starting hole 19, the wire electrode carries out a known rearward movement to the die path and effects all of the finish cuts 5 and 6 along this cutout path.

Having again returned to the starting hole 19, the wire electrode is moved over the shortest distance to the starting point 20. In the same way as previously in the case of the workpiece E, in the case of workpiece F the wire electrode is also guided after reaching the starting hole 21 in such a manner that all finish cuts still necessary are effected.

From the starting hole 21, the wire electrode is then moved to the starting point 10 for the workpiece C and from there to the starting hole 11. After a short path of introduction, the wire electrode, after the securing of the punch with respect to the workpiece has already been effected, performs the punch parting cut 7, as well as all punch finish cuts 8 along the parting-cut path. After these cuts, the electrode is brought back to the starting hole 11 outside the punch, from there to the starting point 12 for the machining of the workpiece D, and from there to the starting hole 13. From the starting hole 13, the same punch parting cut and the same punch finish cuts 8 along the parting-cut path now take place as happened already in the case of the workpiece C. Finally, FIG. 3d shows how the workpieces A, B, as well as the workpiece G, are machined in full removal. For this purpose, in each case starting points 22, 24 and 26 are provided from which corresponding starting holes 23, 25, 27 and 28 of the aforementioned workpieces are reached. The full removal can then be effected, as already explained, without securing of the drop-out piece.

In FIGS. 4a to 4d, the cutting sequence for several types of cuts and several workpieces with late parting cut can be noted.

Figure 4A:
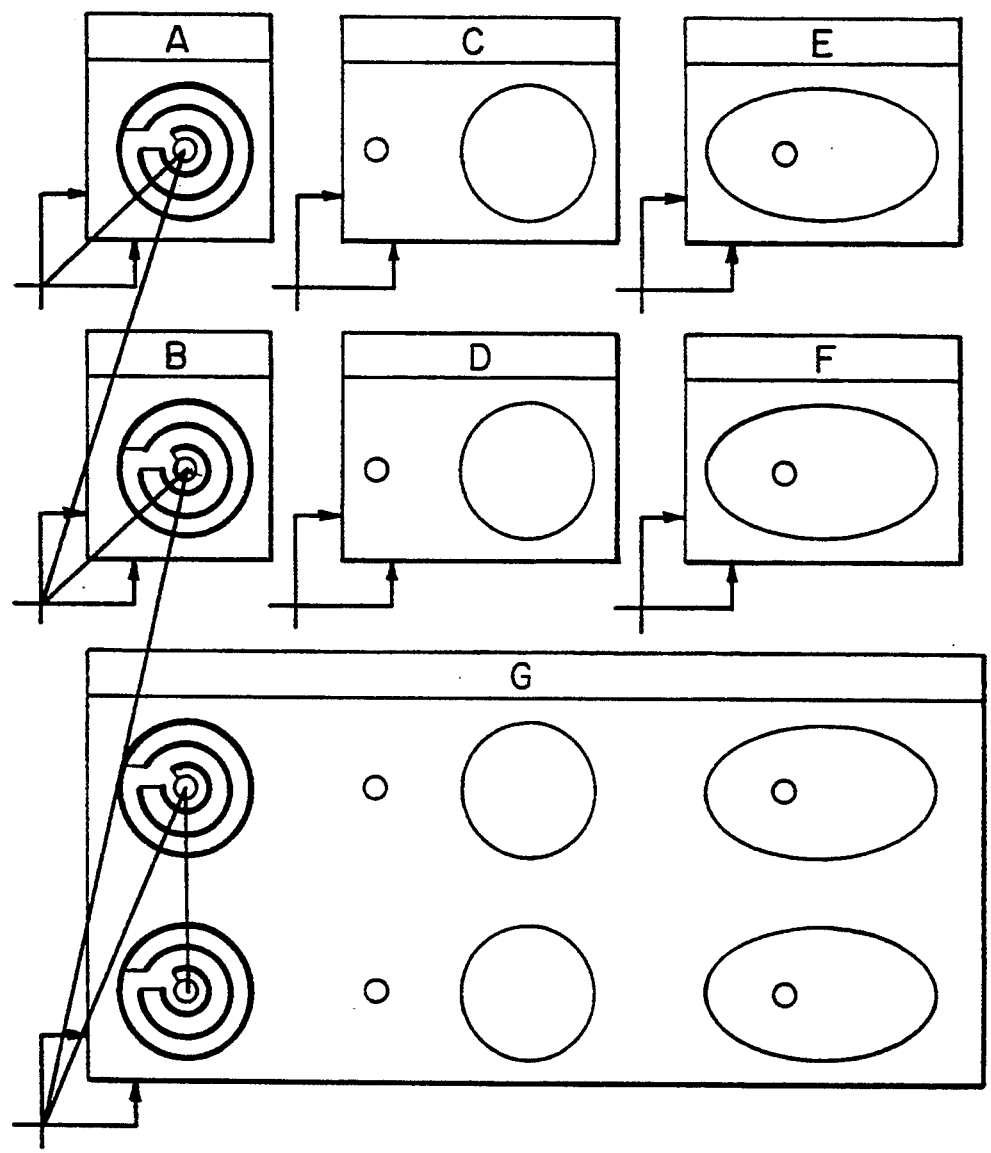
FIGS. 4a, 4b, 4c and 4d show the cutting sequence for several types of cuts and several workpieces with late parting cut.
Figure 4B:
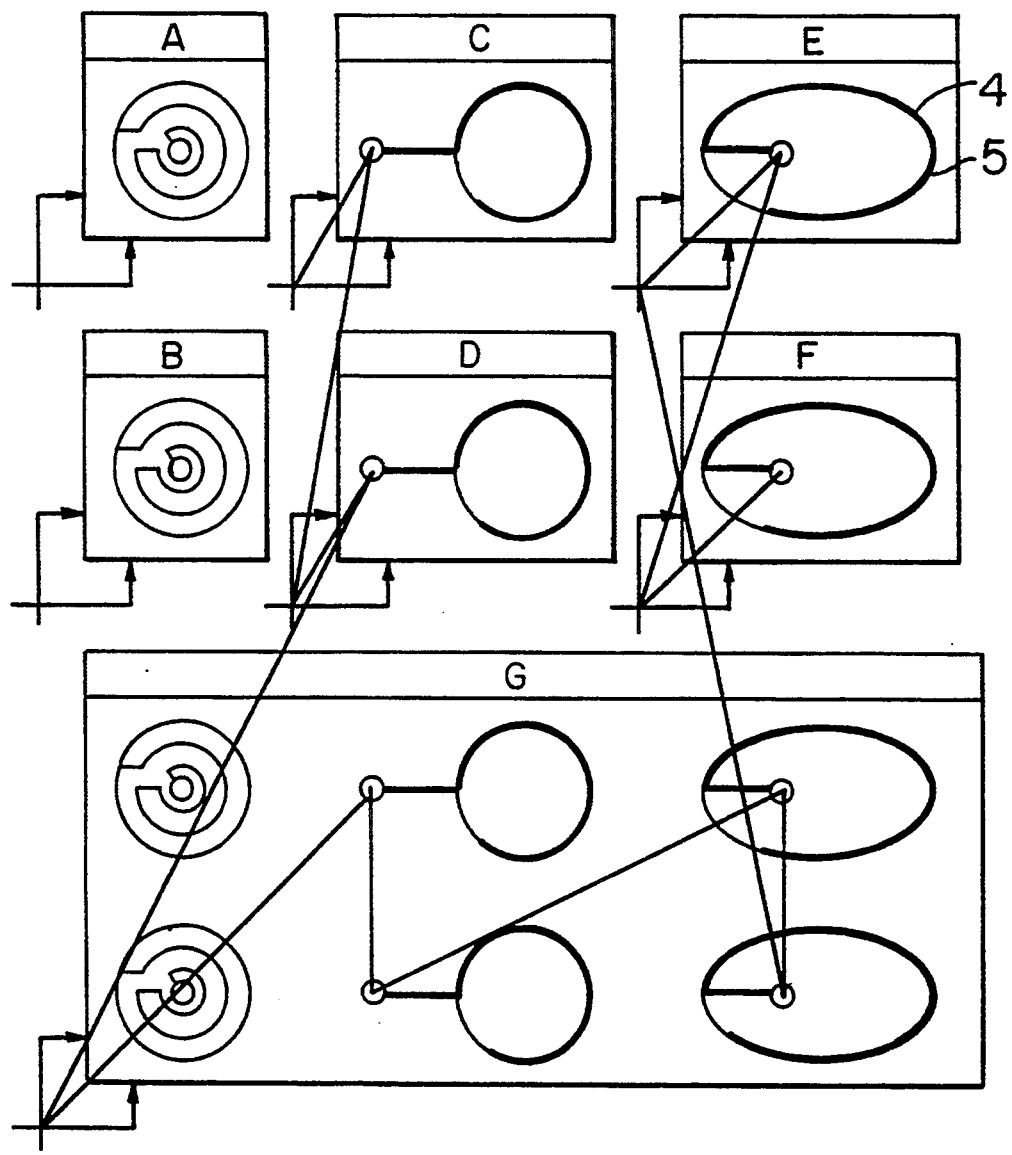

In FIG. 4a, first of all, the above-explained full-removal cuts are effected, which will not be again explained below. FIG. 4b corresponds to the sequence of cuts of FIG. 3a. Differing from the sequence of cuts of FIG. 3a however, all die finish cuts 5 along the full-cut path are also effected in the workpieces E, F, G. Before the presence of the operator, accordingly, all cuts along the full-cut path have been made. There still remain only the cuts 7 and 8 along the parting-cut path.

Figure 4C:
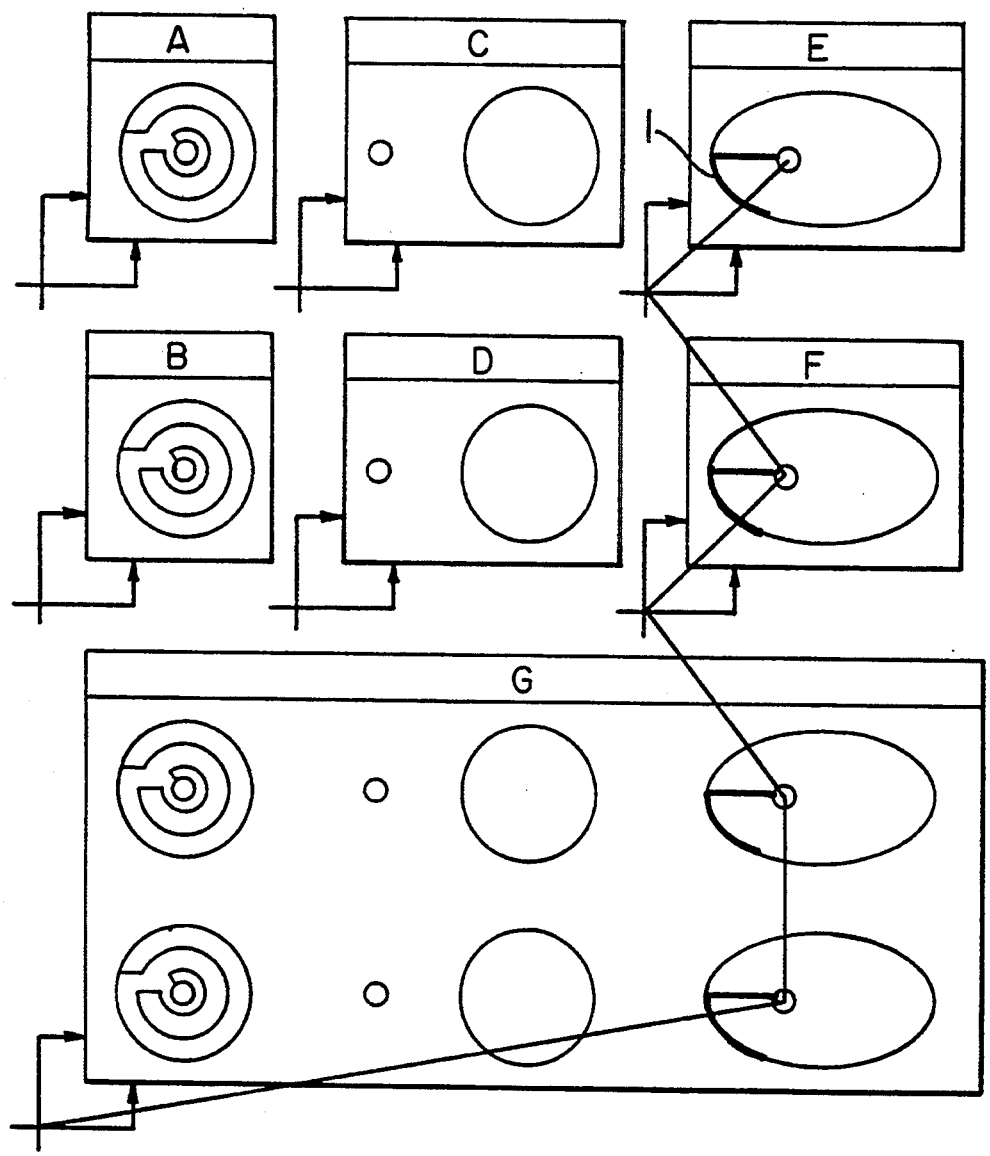
Figure 4D:
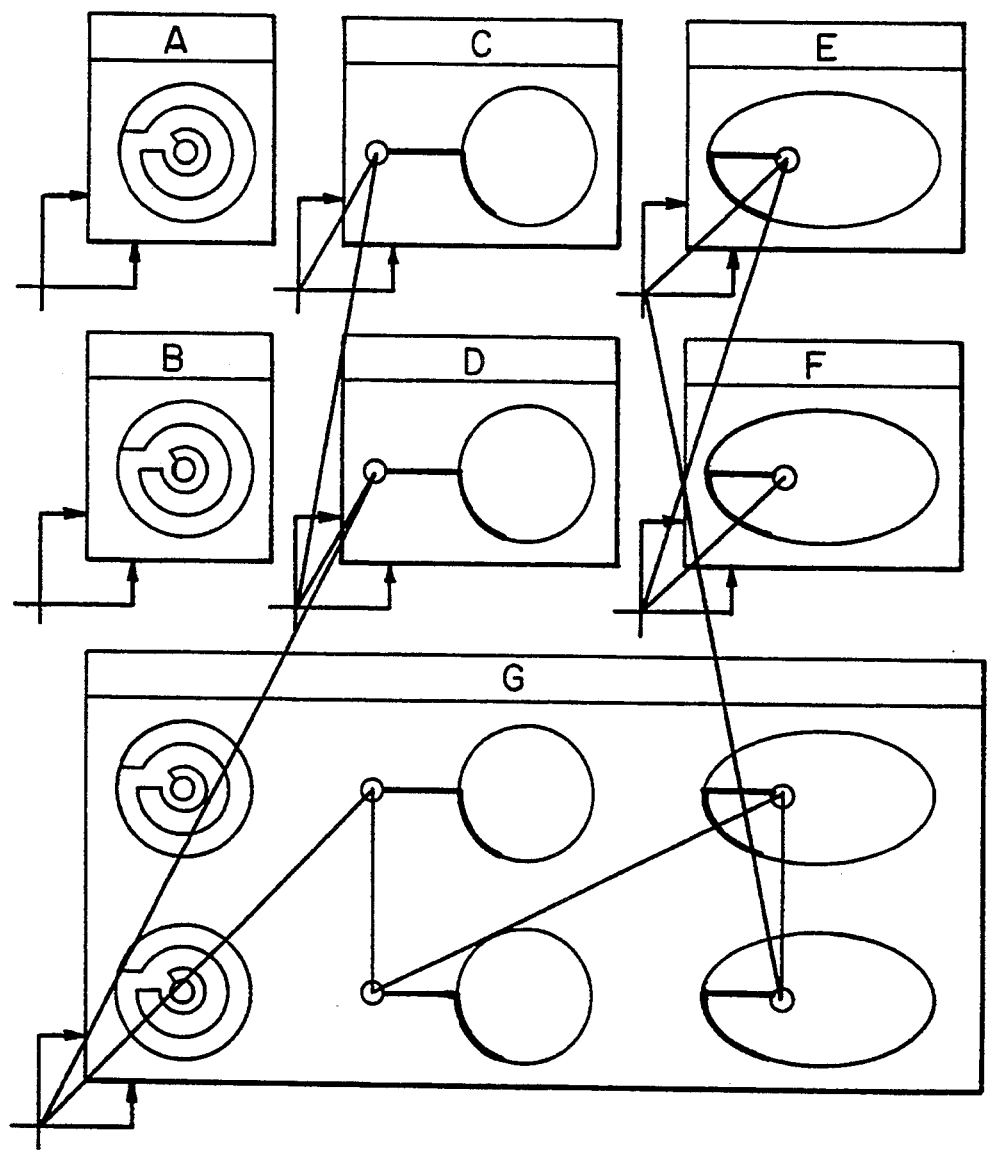

The securing of the punches in the workpieces C, D and G is now effected in known manner. In FIG. 4c, which corresponds to FIG. 3b in the case of the early parting cut, it is shown how, in the presence of the operator, in each case the die parting cut in the workpieces E, F and G is effected. Finally, in FIG. 2 the still remaining cuts in accordance with FIG. 3c are shown. Differing from FIG. 3c, however, the finish cuts in the workpieces E, F and G in accordance with FIG. 4d cover merely the parting-cut path and not also the full-cut path.

What is claimed is:

1. A method for electric discharge cutting of at least one shaped piece in at least one workpiece with a wire cutting electrode, in which at least one shaped piece is machined by at least one solid cut along a first path, at least one parting cut along a second path and at least one finish cut along the first and second paths, wherein the sequence of the cuts is time variable in accordance with operating conditions, wherein one of the operating conditions is the presence of an operator who fixes the time of the operating condition at the start of the cutting operation, and the parting cut is carried out upon the presence of the operator.

2. The method of claim 1, in particular for the cutting of at least one die, wherein at least the solid cut thereof is carried out, then the parting cut thereof and thereupon all the finish cuts thereof.

3. The method of claim 1, in particular for the cutting of at least one die, wherein, first of all, the solid cut thereof is carried out, then a finish cut along the full-cut path, then the parting cut thereof, then a finish cut along the parting-cut path, and thereupon further finish cuts along the total path formed of full-cut and parting-cut paths.

4. The method of claim 1, in particular for the cutting of at least one die, wherein, first of all, the solid cut thereof is carried out, then all finish cuts along the full-cut path, then the parting cut thereof and, following this, all finish cuts along the parting-cut path.

5. The method of claim 1 for the cutting of several shaped pieces by at least one solid cut, a parting cut and at least, in each case, one finish cut, wherein the parting cuts are carried out directly one after the other.

6. The method of claim 5, wherein aside from the dies, at least one punch is cut.

7. The method of claim 6, wherein, before the parting cut of the die or dies, a solid cut is carried out, followed by all finish cuts of the punch along the full-cut path thereof.

8. The method of claim 6, wherein after the parting cut of the die or dies is carried out, the parting cut of the punch and all finish cuts are carried out along the parting-cut path thereof.

* * * * *